US009923262B2

(12) United States Patent
Lee et al.

(10) Patent No.: US 9,923,262 B2
(45) Date of Patent: Mar. 20, 2018

(54) MOBILE DEVICE

(71) Applicant: Quanta Computer Inc., Taoyuan (TW)

(72) Inventors: Chi-Hsuan Lee, Taoyuan (TW); Chung-Ting Hung, Taoyuan (TW); Tsung-Ying Hsieh, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 50 days.

(21) Appl. No.: 14/880,496

(22) Filed: Oct. 12, 2015

(65) Prior Publication Data

US 2017/0025738 A1    Jan. 26, 2017

(30) Foreign Application Priority Data

Jul. 20, 2015   (TW) .............................. 104123371 A (51) Int. Cl.
| | | |
|---|---|---|
| *H01Q 1/24* | (2006.01) | |
| *H01Q 9/04* | (2006.01) | |
| *H04M 1/02* | (2006.01) | |

(52) U.S. Cl.
CPC .......... *H01Q 1/243* (2013.01); *H01Q 9/0421* (2013.01); *H04M 1/026* (2013.01)

(58) Field of Classification Search
CPC   H01Q 1/243; H01Q 1/38; H01Q 7/00; H01Q 1/12; H01Q 13/10
USPC ........ 343/702, 732, 748, 764, 767, 866, 878
See application file for complete search history.

(56) References Cited

U.S. PATENT DOCUMENTS

| | | | | |
|---|---|---|---|---|
| 5,497,164 A | * | 3/1996 | Croq ................... | H01Q 9/0414 |
| | | | | 343/700 MS |
| 6,970,137 B1 | * | 11/2005 | Maslovski ............ | H01Q 1/243 |
| | | | | 343/700 MS |
| 2011/0156975 A1 | * | 6/2011 | Pros ....................... | H01Q 1/243 |
| | | | | 343/767 |
| 2012/0223869 A1 | | 9/2012 | Kim et al. | |

FOREIGN PATENT DOCUMENTS

CN           103094681          5/2013

OTHER PUBLICATIONS

Chinese language office action dated Sep. 5, 2016, issued in application No. TW 104123371.
Wahid, A., et al.; "CSRR Loaded Mircrostrip Array Antenna With Low Sidelobe Level;" IEEE Antennas and Wireless Propagation Letters; vol. 14; Jan. 2015; pp. 1169-1171.

\* cited by examiner

*Primary Examiner* — Dameon E Levi
*Assistant Examiner* — Collin Dawkins
(74) *Attorney, Agent, or Firm* — McClure, Qualey & Rodack, LLP (57) ABSTRACT

A mobile device includes a ground plane, an antenna element, and one or more ring resonators. The ground plane has a first region and a second region. The antenna element is disposed on the first region. The ring resonators are disposed on the second region. Each of the ring resonators includes a first loop structure and a second loop structure. The ring resonators are configured to enhance the radiation gain of the antenna element in a zenith direction.

8 Claims, 6 Drawing Sheets

MOBILE DEVICE

CROSS REFERENCE TO RELATED APPLICATIONS

This application claims priority of Taiwan Patent Application No. 104123371 filed on Jul. 20, 2015, the entirety of which is incorporated by reference herein.

BACKGROUND OF THE INVENTION

Field of the Invention

The disclosure generally relates to a mobile device, and more specifically, to a mobile device with an antenna element.

Description of the Related Art

With the progress of mobile communication technology, mobile devices like portable computers, mobile phones, tablet computers, multimedia players, and other hybrid functional portable electronic devices have become more common. To satisfy the demand of users, mobile devices can usually perform wireless communication functions. Some functions cover a large wireless communication area; for example, mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some functions cover a small wireless communication area; for example, mobile phones using Wi-Fi and Bluetooth systems and using frequency bands of 2.4 GHz, 5.2 GHz, and 5.8 GHz.

GPS (Global Positioning System) is an important technology for positioning in wireless communication systems nowadays, and it is almost a standard element in every mobile device. However, a GPS antenna cannot usually align its maximum gain direction with the zenith direction because there is limited space in the mobile device, resulting in the problem of an imprecise position process.

BRIEF SUMMARY OF THE INVENTION

In a preferred embodiment, the invention is directed to a mobile device including a ground plane, an antenna element, and one or more ring resonators. The ground plane has a first region and a second region. The antenna element is disposed on the first region. The ring resonators are disposed on the second region. Each of the ring resonators includes a first loop structure and a second loop structure. The ring resonators are configured to enhance the radiation gain of the antenna element in a zenith direction.

In some embodiments, the antenna element is a GPS (Global Positioning System) antenna disposed toward a zenith direction.

In some embodiments, the ring resonators are configured to enhance radiation gain of the antenna element in the zenith direction.

In some embodiments, the second loop structure is completely separate from the first loop structure.

In some embodiments, the first loop structure has a first notch, and the second loop structure has a second notch. The second notch does not overlap with the first notch.

In some embodiments, the first loop structure and the second loop structure substantially have square shapes with identical sizes.

In some embodiments, the antenna element resonates with the ring resonators in a GPS (Global Positioning System) frequency band.

In some embodiments, the mobile device includes eight ring resonators, four of which are positioned at a first side of the second region and arranged in a straight line, and the other four of which are positioned at a second side of the second region and arranged in another straight line. The second side is opposite to the first side.

In some embodiments, the ring resonators are symmetrical with respect to a central line of the second region.

In some embodiments, the antenna element is a PIFA (Planar Inverted F Antenna) positioned at a first side of the first region.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Figure 1A:
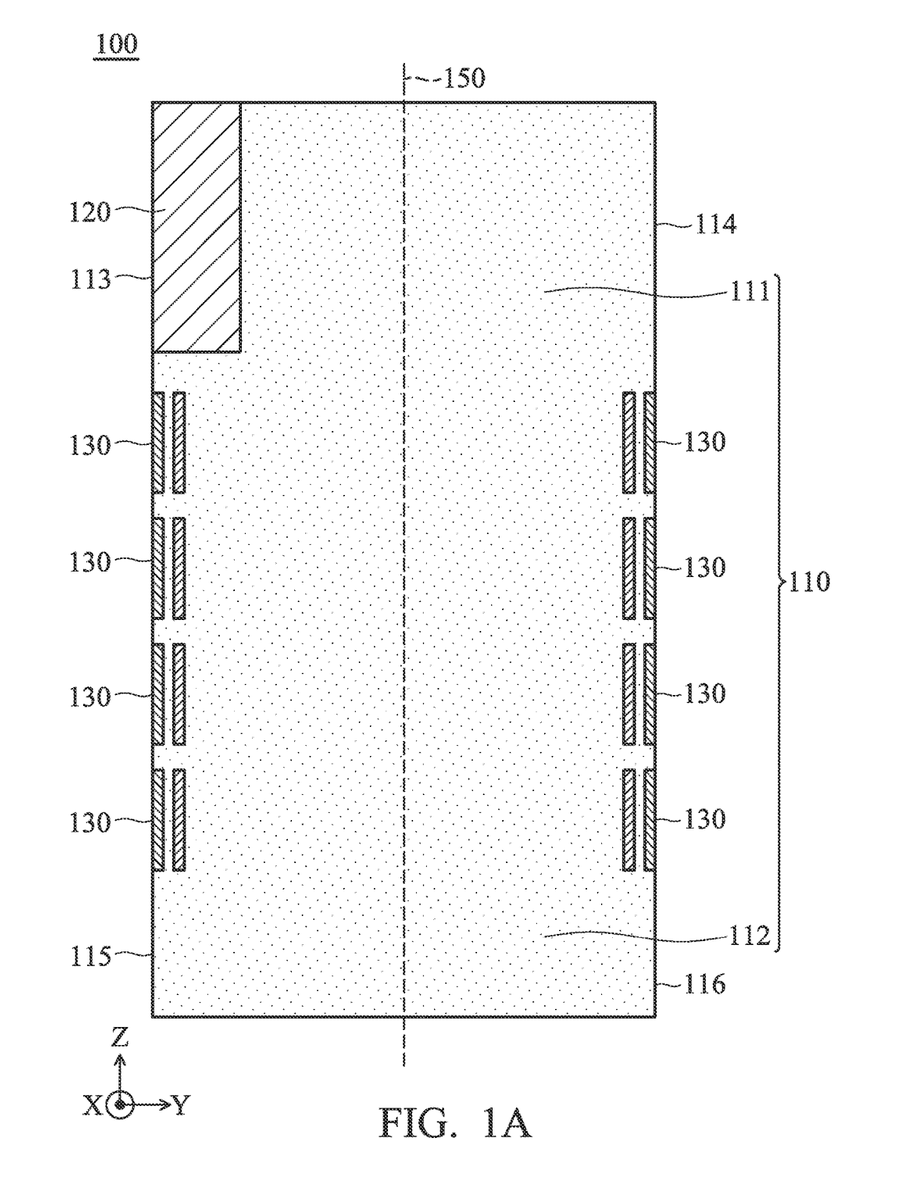
FIG. 1A is a top view of a mobile device according to an embodiment of the invention.
Figure 1B:
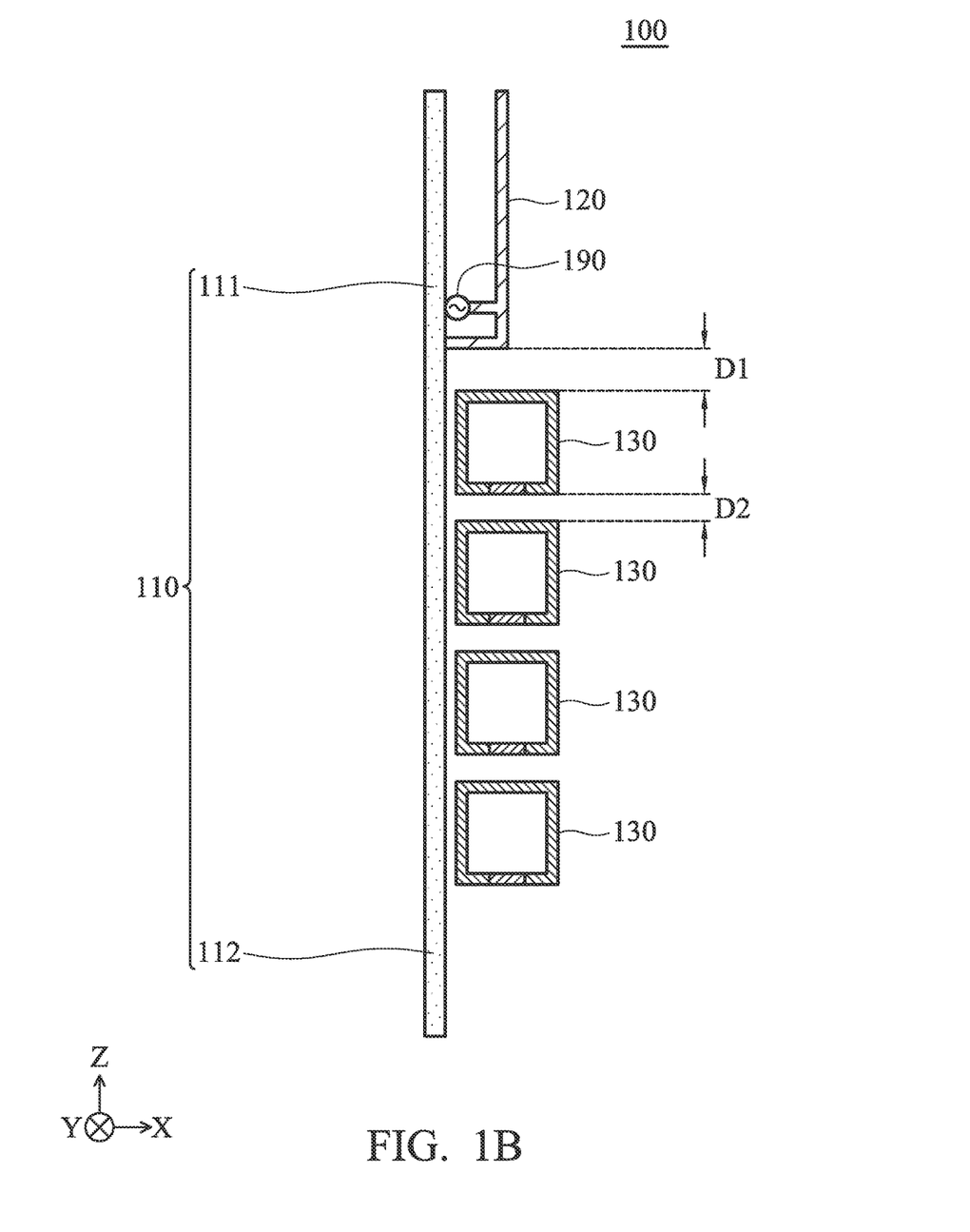
FIG. 1B is a side view of a mobile device according to an embodiment of the invention.

FIG. 1A is a top view of a mobile device 100 according to an embodiment of the invention. FIG. 1B is a side view of the mobile device 100 according to an embodiment of the invention. Please refer to FIG. 1A and FIG. 1B together. The mobile device 100 may be a smartphone, a tablet computer, or a notebook computer. As shown in FIG. 1A and FIG. 1B, the mobile device 100 at least includes a ground plane 110, an antenna element 120, and one or more ring resonators 130. The ground plane 110, the antenna element 120, and the ring resonators 130 may be made of conductive materials, such as copper, silver, aluminum, iron, or their alloys. It should be understood that the mobile device 100 may further include other components, such as a processor, a display device, a touch control module, a battery, and a housing (not shown).

The ground plane 110 substantially has a rectangular shape, and it has a first region 111 and a second region 112. The first region 111 is positioned at an upper portion of the ground plane 110 and toward a zenith direction (e.g., the +Z axis direction in figures). The second region 112 is positioned at a lower portion of the ground plane 110 and toward a ground direction (e.g., the −Z axis direction in figures).

The antenna element 120 is disposed on the first region 111 of the ground plane 110. The shape and type of the antenna element 120 are not limited in the invention. For example, the antenna element 120 may be a monopole antenna, a dipole antenna, a loop antenna, a helical antenna, a PIFA (Planar Inverted F Antenna), or a chip antenna. The ring resonators 130 are disposed on the second region 112 of the ground plane 110. The number and shape of the ring resonators 130 are not limited in the invention. For example, the mobile device 100 may include one, two, four, eight, sixteen or more ring resonators 130, and these ring resonators 130 may have square shapes, rectangular shapes, triangular shapes, or other, irregular shapes.

In the embodiment of FIG. 1A and FIG. 1B, the inner components of the mobile device 100 are arranged as follows. It should be understood that these contents are just exemplary for readers to understand the invention easily, but they are not limitations of the scope of claims of the present application.

The antenna element 120 is a GPS (Global Positioning System) antenna. For example, the antenna element 120 may be a PIFA (Planar Inverted F Antenna) excited by a signal source 190. The antenna element 120 is positioned at a first side 113 of the first region 111 so as to form an asymmetrical arrangement, and it is disposed toward the zenith direction (e.g., the +Z axis direction in figures). In alternative embodiments, the antenna element 120 is positioned at a second side 114 of the first region 111. The mobile device 100 includes eight ring resonators 130. The four ring resonators 130 are positioned at a first side 115 of the second region 112 and arranged in a straight line. The other four ring resonators 130 are positioned at a second side 116 of the second region 112 and arranged in another straight line. The second side 116 of the second region 112 is opposite to the first side 115 of the second region 112. The aforementioned two straight lines are parallel to each other. In other words, all of the ring resonators 130 are symmetrical with respect to a central line 150 of the second region 112. The plane, on which each ring resonator is disposed, is substantially perpendicular to the ground plane 110.

Figure 2A:
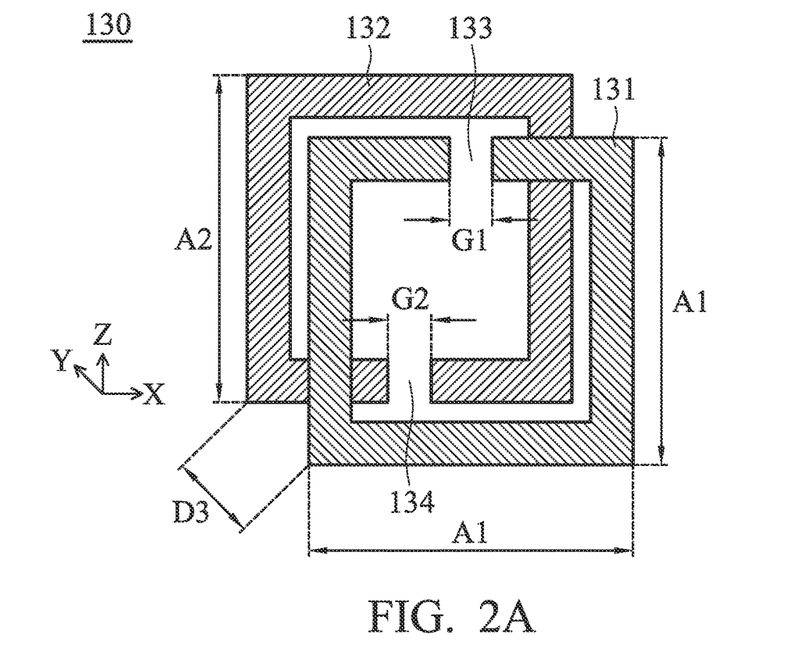
FIG. 2A is a diagram of a ring resonator according to an embodiment of the invention.

FIG. 2A is a diagram of the ring resonator 130 according to an embodiment of the invention. As shown in FIG. 2A, each ring resonator 130 includes a first ring structure 131 and a second ring structure 132. In some embodiments, the first ring structure 131 and the second ring structure 132 are disposed on two opposite surfaces of a FPCB (Flexible Printed Circuit Board). In alternative embodiments, the first ring structure 131 and the second ring structure 132 are disposed on a housing or a back cover of the mobile device 100. The antenna element 120 resonates with the ring resonators 130 in a GPS frequency band. The ring resonators 130 are configured to enhance the radiation gain of the antenna element 120 in the zenith direction. More specifically, the first ring structure 131 and the second ring structure 132 substantially have hollow square shapes with identical sizes. The second ring structure 132 is completely separate from the first ring structure 131, and they are disposed parallel to each other. The first ring structure 131 has a first notch 133. The second ring structure 132 has a second notch 134. The second notch 134 does not overlap with the first notch 133. The first notch 133 and the second notch 134 are positioned at two opposite sides of the ring resonator 130, respectively. The first loop structure 131 and the second loop structure 132 are symmetrical with respect to a central point of both. For example, if the shape of the first ring structure 131 is rotated by 180 degrees, it can be the same as the shape of the second ring structure 132. However, the invention is not limited to the above. In other embodiments, the first ring structure 131 and the second ring structure 132 may have different shapes and sizes.

Figure 2B:
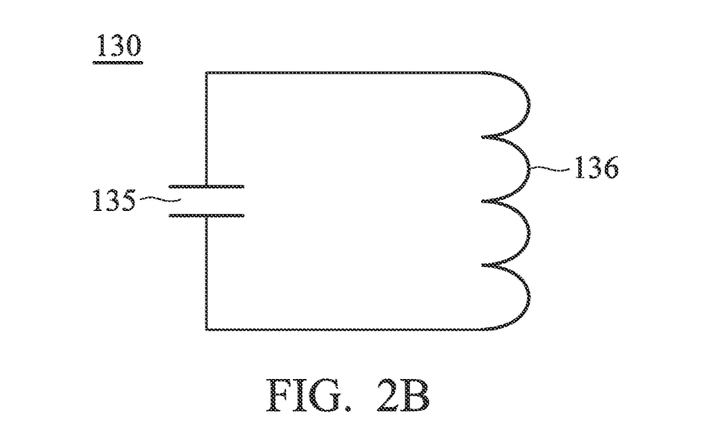
FIG. 2B is a diagram of an equivalent circuit of a ring resonator according to an embodiment of the invention.

FIG. 2B is a diagram of an equivalent circuit of the ring resonator 130 according to an embodiment of the invention. As shown in FIG. 2B, the equivalent circuit is formed by the ring resonator 130 including the first ring structure 131 and the second ring structure 132. The equivalent circuit includes an effective capacitor 135 and an effective inductor 136. The effective capacitor 135 is coupled in parallel with the effective inductor 136. The resonant frequency of the equivalent circuit is derived as the equation (1).

$$F = \frac{1}{2\pi} \times \frac{1}{\sqrt{LC}} \tag{1}$$

where "F" represents the resonant frequency of the equivalent circuit, "C" represents a capacitance of the effective capacitor 135, and "L" represents an inductance of the effective inductor 136.

In order to obtain the desired resonant frequency F, the capacitance C and the inductance L may be controlled by adjusting the size of the ring resonator 130. For example, if a side length A1 of the first ring structure 131 increases or a side length A2 of the second ring structure 132 increases, the inductance L will increase and the resonant frequency F will decrease. If the side length A1 of the first ring structure 131 decreases or the side length A2 of the second ring structure 132 decreases, the inductance L will decrease and the resonant frequency F will increase. If the width G1 of the first notch 133 increases or the width G2 of the second notch 134 increases, the inductance L will increase and the resonant frequency F will decrease. If the width G1 of the first notch 133 decreases or the width G2 of the second notch 134 decreases, the inductance L will decrease and the resonant frequency F will increase. If the spacing D3 between the first ring structure 131 and the second ring structure 132 increases, the capacitance C1 will decrease and the resonant frequency F will increase. If the spacing D3 between the first ring structure 131 and the second ring structure 132 decreases, the capacitance C1 will increase and the resonant frequency F will decrease. Accordingly, the antenna designer can easily control the resonant frequency of the ring resonators 130, and fine-tune it to be consistent with the resonant frequency of the antenna element 120.

Figure 3:
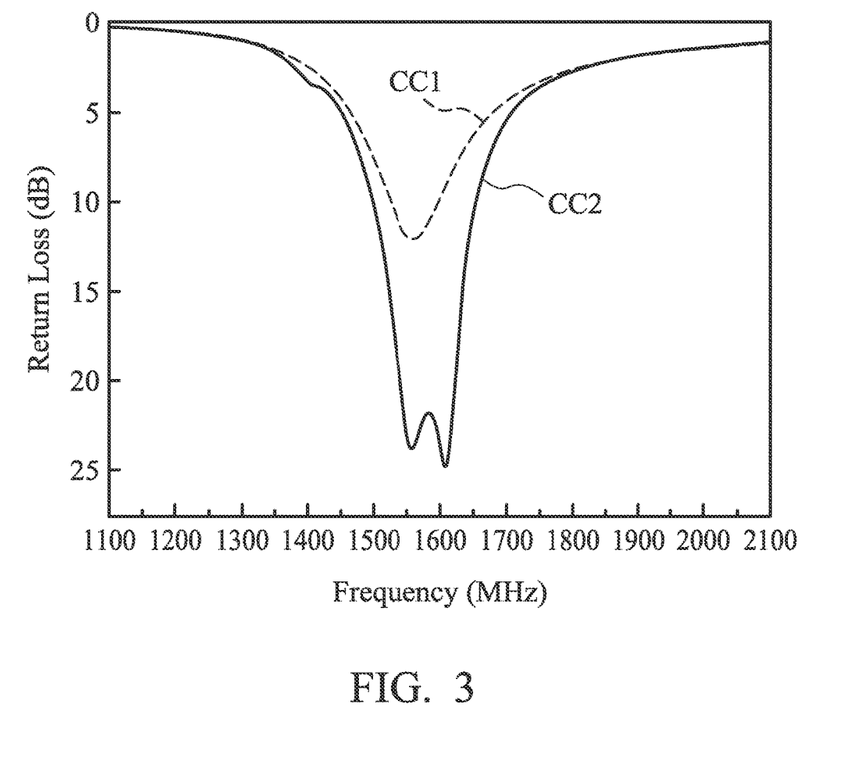
FIG. 3 is a diagram of return loss of an antenna element of a mobile device according to an embodiment of the invention.

FIG. 3 is a diagram of return loss of the antenna element 120 of the mobile device 100 according to an embodiment of the invention. The horizontal axis represents the operation frequency (MHz), and the vertical axis represents the return loss (dB). A first curve CC1 represents the operation characteristics of the antenna element 120 without any ring resonator, and its resonant frequency is from about 1525 MHz to about 1595 MHz. A second curve CC2 represents the operation characteristics of the antenna element 120 with the ring resonators 130, and its resonant frequency is from about 1495 MHz to about 1655 MHz. According to the measurement of FIG. 3, after the ring resonators 130 are added, the bandwidth of the antenna element 120 increases by about 2.2% in comparison to that the original arrangement. Therefore, the ring resonators 130 can help to improve the impedance matching of the antenna element 120.

Figure 4A:
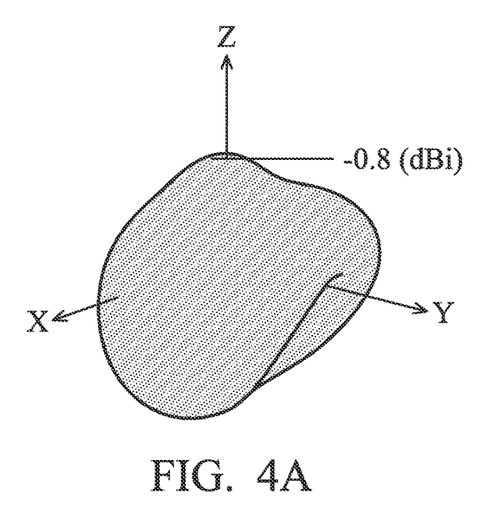
FIG. 4A is a 3D (Three-dimensional) diagram of gain of an antenna element when a mobile device has no ring resonator.
Figure 4B:
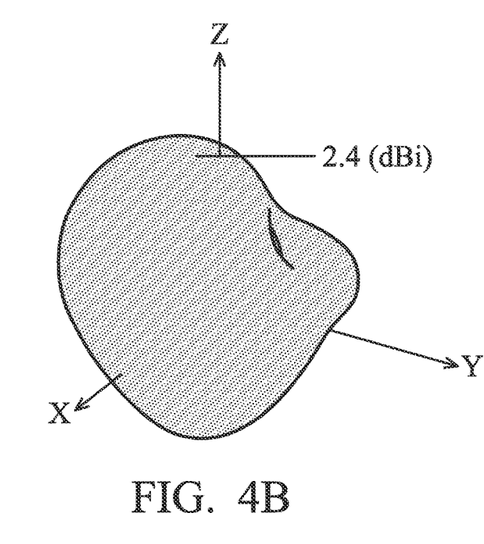
FIG. 4B is a 3D diagram of gain of an antenna element when a mobile device has ring resonators, according to an embodiment of the invention.

FIG. 4A is a 3D (Three-dimensional) diagram of gain of the antenna element 120 when the mobile device 100 includes no ring resonator, and the antenna element 120 has antenna gain of about −0.81 dBi in the zenith direction (e.g., the +Z axis direction in figures). FIG. 4B is a 3D diagram of gain of the antenna element 120 when the mobile device 100 includes the ring resonators 130, according to an embodiment of the invention, and the antenna element 120 has antenna gain of about 1.6 dBi in the zenith direction (e.g., the +Z axis direction in figures). According to the measurement of FIG. 4A and FIG. 4B, after the ring resonators 130 are added into the mobile device 100, the radiation gain of the antenna element 120 is improved by 2.4 dBi in the zenith direction, and therefore the ring resonators 130 can help to improve the performance of the corresponding GPS.

Figure 5:
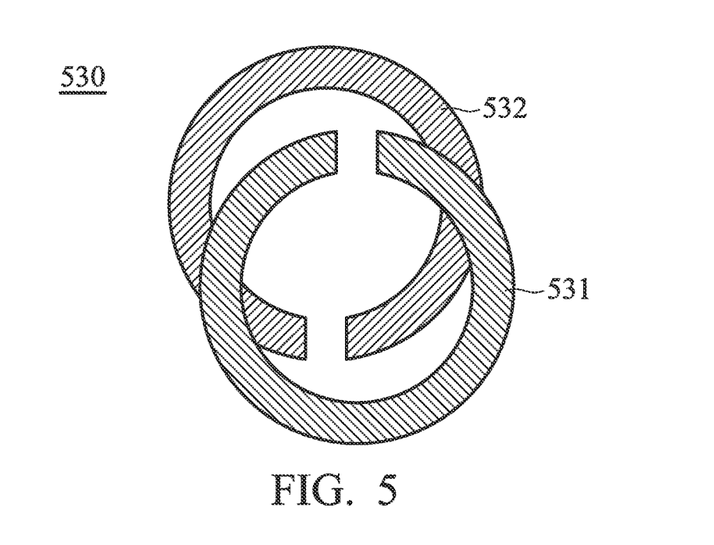
FIG. 5 is a diagram of a ring resonator according to an embodiment of the invention.

FIG. 5 is a diagram of a ring resonator 530 according to an embodiment of the invention. In the embodiment of FIG. 5, the ring resonator 530 includes a first ring structure 531 and a second ring structure 532. The first ring structure 531 and the second ring structure 532 substantially have hollow circular shapes with identical sizes, and they have notches at their edges. The ring resonator 530 may be applied to the above mobile device 100, and its performance is similar to that of the ring resonator 130 of FIG. 2A.

Figure 6:
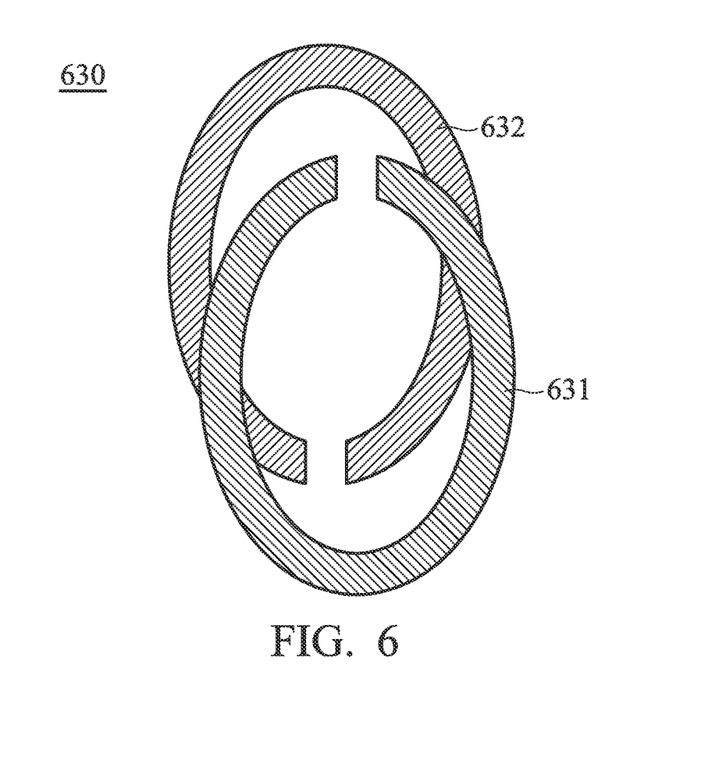
FIG. 6 is a diagram of a ring resonator according to an embodiment of the invention.

FIG. 6 is a diagram of a ring resonator 630 according to an embodiment of the invention. In the embodiment of FIG. 6, the ring resonator 630 includes a first ring structure 631 and a second ring structure 632. The first ring structure 631 and the second ring structure 632 substantially have hollow elliptical shapes with identical sizes, and they have notches at their edges. The ring resonator 630 may be applied to the above mobile device 100, and its performance is similar to that of the ring resonator 130 of FIG. 2A.

In some embodiments, the element sizes of the mobile device 100 are as follows. Please refer to FIG. 1A, FIG. 1B, and FIG. 2A again. The spacing D1 between the antenna element 120 and its closest ring resonator 130 is from about 6 mm to about 8 mm, and is preferably 7 mm. The spacing D2 between any two adjacent ring resonators 130 is from about 0.5 mm to about 1.5 mm, and is preferably 1 mm. The side length A1 of the first ring structure 131 is from about 11 mm to about 17 mm, and is preferably 14 mm. The width G1 of the first notch 133 is from about 2 mm to about 4 mm, and is preferably 3 mm. The side length A2 of the second ring structure 132 is from about 11 mm to about 17 mm, and is preferably 14 mm. The width G2 of the second notch 134 is from about 2 mm to about 4 mm, and is preferably 3 mm. The spacing D3 between the first ring structure 131 and the second ring structure 132 is from about 0.25 mm to about 0.75 mm, and is preferably 0.5 mm.

The invention proposes a mobile device including an antenna element and ring resonators. The ring resonators can resonate with the antenna element at the same frequency. With such a design, the ring resonators are configured to change the surface current distribution on the ground plane. The ring resonators can modify the radiation pattern of the antenna element, such that the maximum gain direction of the antenna element is consistent with the zenith direction. In comparison to conventional designs, the invention at least has the advantages of enhancing the antenna gain in the zenith direction, improving the GPS performance, reducing the manufacturing cost, and simplifying the antenna structure, and it is suitable for application in a variety of small-size mobile communication devices.

Note that the above element sizes, element shapes, and frequency ranges are not limitations of the invention. An antenna engineer can adjust these settings or values according to different requirements. It should be understood that the mobile device of the invention is not limited to the configurations of FIGS. 1-6. The invention may merely include any one or more features of any one or more embodiments of FIGS. 1-6. In other words, not all of the features shown in the figures should be implemented in the mobile device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A mobile device, comprising:
a ground plane, having a first region and a second region;
an antenna element, disposed on the first region; and
a plurality of ring resonators, disposed on the second region, wherein each of the ring resonators comprises a first loop structure and a second loop structure;
wherein the antenna element is a GPS (Global Positioning System) antenna disposed toward a zenith direction;
wherein the second region is different from the first region;
wherein a half of the ring resonators are positioned at a first side of the second region and arranged in a straight line, and the other half of the ring resonators are positioned at a second side of the second region and arranged in another straight line, and wherein the second side is opposite to the first side;
wherein the ring resonators are symmetrical with respect to a central line between the first side and the second side of the second region.

2. The mobile device as claimed in claim 1, wherein the ring resonators are configured to enhance radiation gain of the antenna element in the zenith direction.

3. The mobile device as claimed in claim 1, wherein the second loop structure is completely separate from the first loop structure.

4. The mobile device as claimed in claim 1, wherein the first loop structure has a first notch, the second loop structure has a second notch, and the second notch does not overlap with the first notch.

5. The mobile device as claimed in claim 1, wherein the first loop structure and the second loop structure substantially have square shapes with identical sizes.

6. The mobile device as claimed in claim 1, wherein the mobile device comprises eight ring resonators.

7. The mobile device as claimed in claim 1, wherein the antenna element is a PIFA (Planar Inverted F Antenna) positioned at a first side of the first region.

8. A mobile device, comprising:
a ground plane, having a first region and a second region;
an antenna element, disposed on the first region; and
a plurality of ring resonators, disposed on the second region, wherein each of the ring resonators comprises a first loop structure and a second loop structure, wherein the antenna element resonates with the ring resonators in a GPS (Global Positioning System) frequency band;
wherein the second region is different from the first region;

wherein a half of the ring resonators are positioned at a first side of the second region and arranged in a straight line, and the other half of the ring resonators are positioned at a second side of the second region and arranged in another straight line, and wherein the second side is opposite to the first side;

wherein the ring resonators are symmetrical with respect to a central line between the first side and the second side of the second region.

* * * * *